United States Patent [19]

Chang et al.

[11] 4,382,989
[45] May 10, 1983

[54] ROOFING ASPHALT FORMULATION

[75] Inventors: Irving B. Chang, Morristown; Robert E. Beckwith, Jr., Bernardsville, both of N.J.

[73] Assignee: Allied Corporation, Morris Township, Morris County, N.J.

[21] Appl. No.: 314,903

[22] Filed: Oct. 26, 1981

Related U.S. Application Data

[62] Division of Ser. No. 202,206, Oct. 30, 1980, Pat. No. 4,328,147.

[51] Int. Cl.$^3$ ............................................. D04H 1/08
[52] U.S. Cl. .............................. 428/280; 106/273 R; 106/278; 106/279; 106/280; 106/281 R; 427/389; 428/489; 524/59
[58] Field of Search ................... 106/273 R, 278, 279, 106/280, 281 R; 428/280, 489; 524/59; 427/389

[56] References Cited

U.S. PATENT DOCUMENTS

| | | | |
|---|---|---|---|
| 3,703,393 | 11/1972 | Koons | 106/279 |
| 3,716,510 | 2/1973 | Belak et al. | 524/59 |
| 3,829,321 | 8/1974 | Woodruff | 106/277 |
| 4,008,095 | 2/1977 | Fukushima et al. | 106/235 |

*Primary Examiner*—Michael R. Lusignan
*Attorney, Agent, or Firm*—Richard A. Negin

[57] ABSTRACT

The present invention is an asphaltic composition which is useful as a roofing asphalt formulation and method of making this formulation. The composition includes about 39 to 99 percent by weight of oxidized asphalt and between 1 and about 8 percent of oxidized polyethylene. It is preferred to use between about 0 to 40 percent of the saturant, which can be an unoxidized asphalt, to modify the viscosity of the formulation. There can be a filled asphaltic composition comprising about 40 percent by weight to about 99 percent by weight of the asphaltic composition and about 1 percent by weight to about 60 percent by weight of filler, which can be stone dust.

7 Claims, 13 Drawing Figures

ROOFING ASPHALT FORMULATION

This is a division, of Application Ser. No. 202,206, filed Oct. 30, 1980, now U.S. Pat. No. 4,328,147, patented May 4, 1982.

BACKGROUND OF THE INVENTION

This invention is in the field of asphalt compounds; more particularly, the invention relates to a modified roofing asphalt formulation.

Two types of asphalt coated roofing materials are available; built up roofs, and roofs made of roofing shingles. Built up roofing is the type used on horizontal type roof structures which are typically commercial or apartment type buildings. For the built up roofs, asphalt is heated to 400°–450° F., and then mopped on. The saturated asphalt felt is then rolled over. The asphalt which acts both as an adhesive as well as a water-proofing coating, is applied as the roof is being layed down. Because the asphalt for built up roofing must retain adhesive properties, it is less crosslinked or mildly oxidized compared to asphalt prepared for roofing shingles. Roofing stone aggregate is spread over the entire built up roof to provide weather resistance to the built up roof. Roofing stone aggregate can be stone or slag. Its purpose is to prevent ultraviolet rays from degrading the roof coating. The stone allows walking over the roof without disturbing the asphalt.

Roofing shingles are another type of roofing material coated with asphalt. The asphalt is crosslinked or oxidized and is coated onto the roofing felt in a manufacturing step. Generally, the asphalt is filled with stone dust. The asphalt is heated to about 400°–450° F. and spread on and pressed into the roofing felt. Roofing granules are then fed onto the saturated asphalt felt and pressed in.

Roofing felt from a continuous roll is coated with the asphalt formulation at about 400° F. Roofing granules, a colored ceramic stone baked onto stone granules, are pressed into the coating. The shingle color becomes the color of the granules. This coated felt roll is cooled and the shingles, with desired cut-outs, are continuously cut from the continuous shingle roll. Typically, the roll is three feet wide and shingles are one by three feet with cut-outs.

In recent years roofing felt material has been changed from cellulose to glass fibers. The new glass fiber shingle is thinner and more flexible than the old cellulose felt shingle. Therefore, the coating must have better flexibility properties, particularly at cold temperatures. If this is not the case, flexing at cold temperatures causes surface cracking in the shingles. The cracks are failure sites and points for future leaks to develop.

In addition to the change of material for the asphalt roofing felt, the origin of asphalt supplies have changed in recent years, from domestic crudes to Venezuela, Arabian or North Slope sources. These new changes have made it necessary to re-evaluate the construction and composition of roofing shingles and their components, particularly the asphalt coatings. However, asphalts from various sources are commonly blended for uniformity. There is, therefore, a need, in view of the changing requirements of asphalt roofing shingles, to develop a roofing asphalt formulation which can readily be substituted for existing asphalt shingles, both in processing and application.

SUMMARY OF THE INVENTION

The present invention is an asphaltic composition which is useful as a roofing asphalt formulation and method of making this formulation. The composition includes about 39 to 99 percent by weight of oxidized asphalt and between 1 and about 8 percent of oxidized polyethylene. It is preferred to use between about 0 to 40 percent of the saturant, which can be an unoxidized asphalt, to modify the viscosity of the formulation. There can be a filled asphaltic composition comprising about 40 percent by weight to about 99 percent by weight of the asphaltic composition and about 1 percent by weight to about 60 percent by weight of filler, which can be stone dust.

A preferred embodiment of the asphaltic composition of the present invention which can be used as a roofing asphalt formulation, uses about 71 to 89 percent oxidized asphalt, about 1 to 4 percent oxidized polyethylene, and about 10 to 25 percent saturant. A filled asphalt formulation with about 40 to 50 percent by weight of the preferred roofing asphalt formulation can be used with about 50 to 60 percent by weight based on the total weight of the formulation, including the filler, of ground stone dust filler or any other suitable filler. The preferred oxidized polyethylene is a polyethylene having a molecular weight of between 2,000 and 6,000, a softening point between 130° C. and 150° C., and a Brookfield viscosity between 5,000 and 30,000 centipoises at a temperature of 149° C.

The roofing asphalt formulation of the present invention can be made by adding oxidized asphalt to oxidized polyethylene, or by mixing an unoxidized asphalt wih unoxidized polyethylene and oxidizing the mixture in a manner similar to oxidizing asphalt as known in the art.

DESCRIPTION OF PREFERRED EMBODIMENTS

The present invention comprises an asphaltic formulation made of oxidized asphalt, oxidized polyethylene, and optionally a saturant or asphalt cut-back and filler. This composition is particularly useful as a roofing asphalt formulation.

The addition of oxidized polyethylene to oxidized asphalt roof coating increases the coating viscosity and hardness. A saturant such as unoxidized asphalt can modify the viscosity of the roofing asphalt formulation of the present invention. The roof coating viscosity can thereby be modified to be equal to the typical viscosity of roofing asphalt formulations without oxidized polyethylene. In this way the roofing asphalt formulation of the present invention can be substituted into existing processes for forming asphalt roof shingles, and the shingles used in a manner in which they have been used in the past.

A roofing asphalt formulation of the present invention contains between about 52 to 99 percent by weight oxidized asphalt and between about 1 to 8 percent by weight oxidized polyethylene. There can be 0 to 40 percent by weight of saturant. Optionally, the roofing asphalt formulation of the present invention can be filled so that the filled roofing asphalt formulation comprises about 40 to about 99 percent by weight of the roofing asphalt formulation and about 1 to 60 percent by weight of filler. The filler increases resistance to weather, and decreases the cost of the roofing asphalt formulation. A preferred filler used in roofing asphalt formulations known in the art is stone dust. This filler can be used with the present invention.

A preferred roofing formulation range has about 71 to 89 percent oxidized asphalt, about 1 to 4 percent oxidized polyethylene and about 10 to 25 percent saturant. The preferred roofing asphalt can have 1 to 60 percent by weight of filler added to 40 to 99 percent by weight of the roofing asphalt formulation resulting in a preferred filled roofing asphalt formulation.

A particularly preferred formulation which has been successfully used is one containing 77 percent oxidized asphalt, 3 percent oxidized polyethylene and 20 percent saturant. A particularly preferred filled formulation comprises 40 to 50 percent by weight of this preferred formulation and further, 50 to 60 percent by weight of ground stone as filler.

Roofing asphalt is manufactured from refined asphalt. This asphalt is oxidized and crosslinked to give it better weather resistance. The oxidization takes place by mixing the asphalt with air and heating to between 350° F. and 500° F. with or without a catalyst. When no catalyst is used, it takes between 4 to 6 hours to oxidize the asphalt. With a catalyst, the processing time is shortened to between 2 and 4 hours. A preferred catalyst is ferric chloride (FeCl$_3$). Additionally, the roofing asphalt formulation can contain filler. A common filler is 50 to 60 percent by weight of ground stone dust to reduce cost and improve the weather resistance.

The asphalts used to make roofing asphalt formulations are characterized by their geographic origin. As noted in the background, asphalt origins have changed from domestic or Mid-Continent crudes to Venezuela, Arabian or North Slope crude oil sources. The composition of the asphalts from the various locations is different resulting in different properties. However, asphalts from various locations are generally blended for uniformity.

The asphalt roofing formulation should have good low temperature flexural properties. This is particularly important when using fiber-glass shingles. In the present invention, it has been found that mixing oxidized asphalt with oxidized polyethylene results in improved flexibility properties.

Oxidized polyethylene which can be used in the formulations of the present invention has a softening point of 100° to 150° C. as measured by ASTM (E-28); a penetration hardness of about 10.0 dmm to about 0.1 dmm, preferably 9.0 dmm to 0.5 dmm or less as measured by ASTM (D-5); a density of 0.90 to 1.00 grams per cubic centimeter as measured on the ASTM (D-1505); a Brookfield viscosity at 149° C. of 100 to about 40,000 cps; an acid number of about 10 to 35, preferably 15 to 30, based on milligrams of KOH per gram; and a molecular weight of 1,000 to about 10,000, preferably 1,500 to 6,000. Typical oxidized polyethylene polymers which can satisfactorily be used to making roofing asphalt formulations are summarized in Table I:

TABLE I

| Sample | Softening Point °C. (ASTM E-28) | Softening Point °F. | Hardness dmm (ASTM D-5) | Viscosity-cps 149° C. (300° F.) (Brookfield) |
|---|---|---|---|---|
| A | 104 | 219 | 5.5 | 157.5 |
| B | 107 | 225 | 2.5 | 132.5 |
| C | 100 | 212 | 9.0 | 122.5 |
| D | 110 | 230 | 1.5 | 190.0 |
| E | 111 | 232 | 1.2 | 190.0 |
| F | 138 | 280 | <0.5 | 9,000 |
| G | 140 | 284 | <0.5 | 30,000 |

A preferred oxidized polyethylene is Sample F, having a softening point of 138° C.; a hardness of less than 0.5 dmm; a density of 0.99 grams per cubic centimeter; a Brookfield viscosity at 149° C. of between about 8,000 and about 10,000 centipoises (cps) and an acid number of 28 with a molecular weight between 3,000 and 5,000.

Any suitable fillers known in the art can be used with the roofing asphalt formulation. It is preferred to use ground stone, such as limestone or trap rock. The ground stone is used in an amount of preferably 50 to 60 percent by weight of the total weight of the formulation. The stone is ground to a particle size of about 180 microns or less.

The following examples and comparatives were conducted with MId-Continent (MC) and North Slope (NS) asphalts used as coatings and saturants. Satisfactory performance was obtained using material from both sources. Typical oxidized asphalt (coating) and saturant properties are summarized in Table II.

TABLE II

| | Ball & Ring Softening Point (°F.) | Penetration @ 77° F. dmm | Viscosity cps |
|---|---|---|---|
| MC Saturant | 115 | 110 | @ 250° F.-648 |
| MC Coating | 243 | 14 | @ 425° F.-332 |
| NS Saturant | 101 | 306 | @ 250° F.-227 |
| NS Coating | 237 | 17 | @ 425° F.-337 |

The following examples illustrate two aspects of the present invention; first to develop a roofing asphalt formulation which can satisfactorily be applied to fiberglass shingle mat and have satisfactory low temperature flexibility properties; and secondly, this developed roofing asphalt formulation should be readily substituted into existing roofing material production processes. This first aspect was accomplished by adding oxidized polyethylene to oxidize asphalt. The second aspect was accomplished by modifying the formulation with saturant.

The cold temperature flexibility of roofing material containing an asphalt formulation is related to the viscosity of the formulation; the lower the viscosity, the more flexible the asphalt. Further, viscosity is also considered important in processing the asphalt to make roofing material without substantial changes to equipment and processes used with existing material and asphalt composition.

EXAMPLES 1-3

Table III below summarizes a comparison of viscosity at various aging conditions, between Comp. 1-3 of MC oxidized asphalt, and Examples 1-3 of MC oxidized asphalt containing 3% by weight of Sample F oxidized polyethylene, and 20% MC saturant as described in Table I.

TABLE III

| | Aging Temp °F. | Viscosity cps @ 300° F. | | |
|---|---|---|---|---|
| | | 0 Days | 3 Days @ 350° F. | 7 Days @ 350° F. |
| Comp. 1 | 300 | 64,000 | >100,000 | >100,000 |
| Ex. 1 | 300 | 77,000 | 51,000 | 68,500 |
| Comp. 2 | 350 | 4,000 | 5,500 | 8,000 |
| Ex. 2 | 350 | 3,350 | 2,350 | 3,100 |
| Comp. 3 | 400 | 640 | 740 | 910 |
| Ex. 3 | 400 | 910 | 400 | 485 |

EXAMPLES 4-6

Table IV below summarizes a comparison of viscosity at various aging conditions, between Comp. 4-6 of NS oxidized asphalt, and Examples 4-6 of NS oxidized asphalt containing 3% by weight of Sample F oxidized polyethylene, and 20% NS saturant as described in Table I.

TABLE IV

| | Aging Temp °F. | Viscosity cps @ 300° F. | | |
|---|---|---|---|---|
| | | 0 Days | 3 Days @ 350° F. | 7 Days @ 350° F. |
| Comp. 4 | 300 | 53,000 | >100,000 | >100,000 |
| Ex. 4 | 300 | 40,000 | 32,000 | 36,250 |
| Comp. 5 | 350 | 4,100 | 6,000 | 7,100 |
| Ex. 5 | 350 | 2,350 | 1,900 | 2,225 |
| Comp. 6 | 400 | 660 | 810 | 885 |
| Ex. 6 | 400 | 385 | 350 | 400 |

Tables III and IV show that not only does the formulation of the present invention provide a substitutable roofing asphalt formulation, but that the roofing asphalt formulation of the present invention has better properties in retaining its viscosity based on accelerated heat aging test. Specifically, Tables III and IV show that the viscosities of Mid-Continent and North Slope asphalt formulations of the present invention were approximately maintained at 300° F., 350° F. and 400° F. In all cases the viscosity of asphalt without the oxidized polyethylene increased significantly.

The seven day accelerated aging test of the asphalt coating at 350° F. shows that the viscosity of the Example, modified asphalts did not increase whereas the viscosity of the Comparatives showed considerable increase in both asphalts from Mid-Continent and North Slope sources. This indicates that the asphalt formulation of the present invention, will have improved low-temperature properties including flexibility. Similar viscosities at 0 days aging indicate that the Example formulations can be used to produce fiber-glass shingles with the same equipment used to produce roofing shingles made of cellulose felt.

Microphotographs at 425X magnification illustrating the compatibility of materials in the formulation of the present invention are discussed in the examples and comparatives below.

COMPARATIVES 7 and 8

Figure 1:
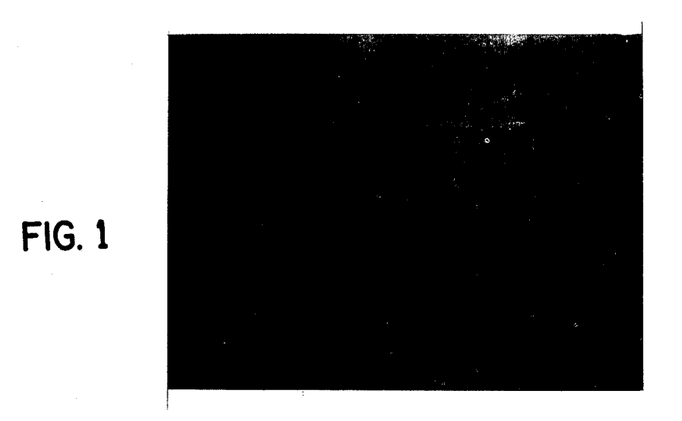
FIG. 1 is a microphotograph of oxidized North Slope asphalt with no additive.
Figure 2:
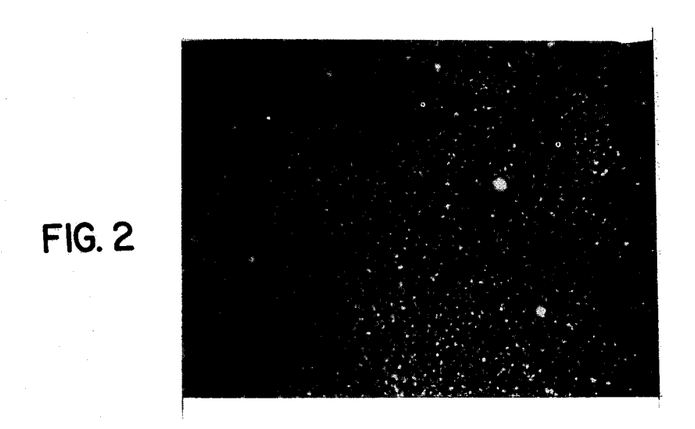
FIG. 2 is a microphotograph of oxidized Mid-Continent asphalt with no additive.

FIGS. 1 and 2 are microphotographs of NS and MC oxidized asphalt respectively. These two materials contain no additives and are unaged. In both cases there is a homogeneous dispersion.

COMPARATIVE 9

Figure 3:
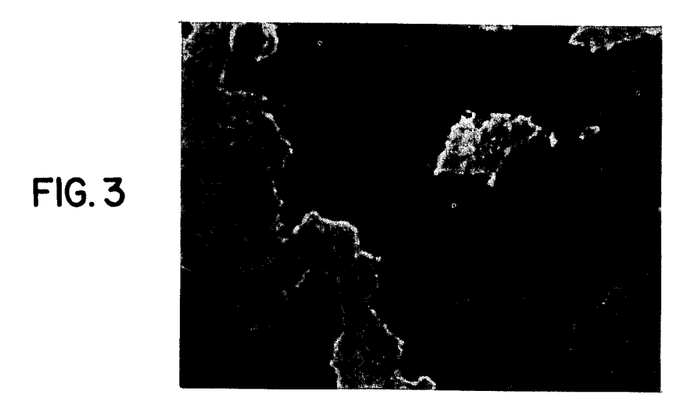
FIG. 3 is a microphotograph of oxidized North Slope asphalt with 5% unoxidized polyethylene.

FIG. 3 is a microphotograph of NS oxidized asphalt with 5% by weight of unoxidized polyethylene. Polyethylene is compatible with asphalt prior to oxidization, but is incompatible when blended to oxidized asphalt. The microphotograph of FIG. 3 shows the colloidal structure of the oxidized asphalt is destroyed and a light oil face separates from the darker colloidal mask. Once the colloidal structure of the asphalt is destroyed, the coating cracks, and does not weather properly.

EXAMPLES 7, 8

Figure 4:
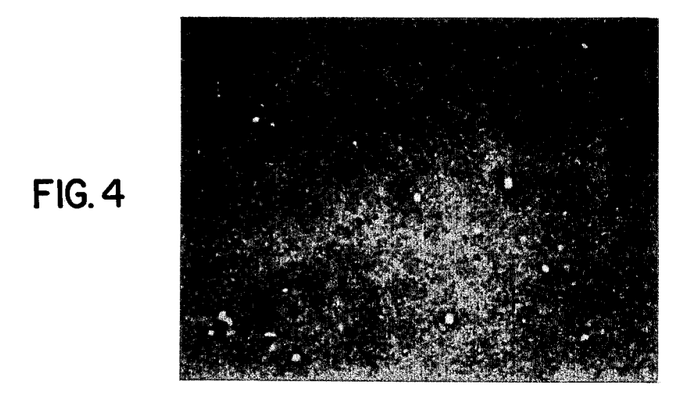
FIG. 4 is a microphotograph of oxidized Mid-Continent asphalt with 8% Sample A oxidized polyethylene, 20% saturant and no aging.
Figure 5:
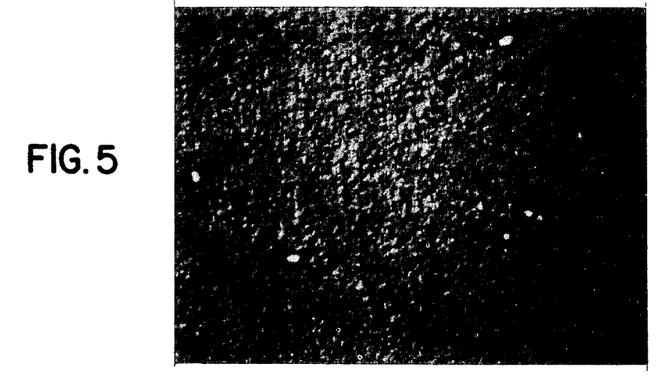
FIG. 5 is a microphotograph of oxidized North Slope asphalt with 8% Sample A oxidized polyethylene, 20% saturant and no aging.

FIG. 4 (Example 7) and FIG. 5 (Example 8), respectively, show: a blend of MC oxidized asphalt, 8% of Sample A oxidized polyethylene and 20% of MC saturant; and a blend of NS oxidized asphalt, 8% of Sample A oxidized polyethylene and 20% of NS saturant. There was no aging and the blend in both examples remained homogeneous as shown in FIGS. 4 and 5.

EXAMPLES 9-16

Examples 9-16, which follow, illustrate the compatability of NS and MC oxidized asphalt at various levels and conditions. The results are summarized in Table V below, which also references the corresponding Figures which are microphotographs at 425X magnification of the corresponding Example sample. FIGS. 1 and 2 are referred to for comparison.

TABLE V

| Ex. | 9 | 10 | 11 | 12 | 13 | 14 | 15 | 16 |
|---|---|---|---|---|---|---|---|---|
| % NS Asphalt | | 77 | | 74 | | 77 | | 77 |
| % MC Asphalt | 77 | | 74 | | 77 | | 77 | |
| % Sample F | 3 | 3 | 6 | 6 | 3 | 3 | 3 | 3 |
| % NS Saturant | | 20 | | 20 | | 20 | | 20 |
| % MC Saturant | 20 | | 20 | | 20 | | 20 | |
| FIG. | 6 | 7 | 8 | 19 | 10 | 11 | 12 | 13 |
| Days Aged @ 350° F. | 0 | 0 | 0 | 0 | 3 | 3 | 7 | 7 |

Figure 6:
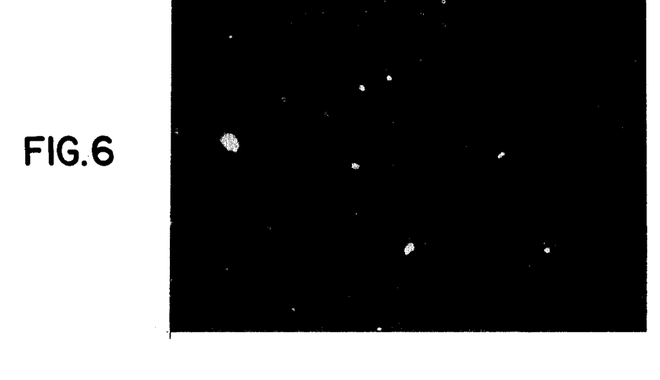
FIG. 6 is a microphotograph of oxidized Mid-Continent asphalt with 3% of Sample F oxidized polyethylene, 20% saturant and no aging.
Figure 7:
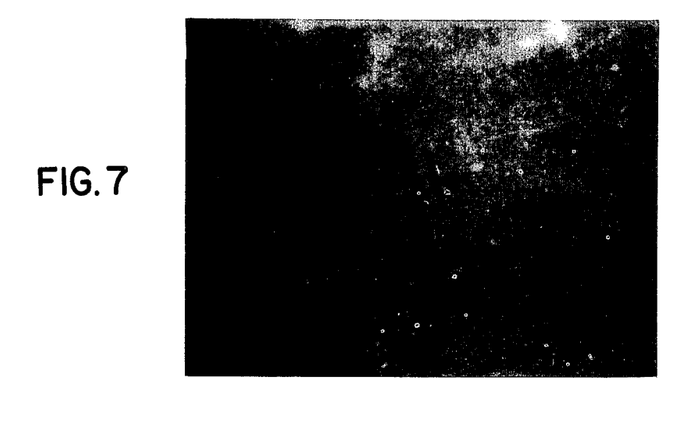
FIG. 7 is a microphotograph of oxidized North Slope asphalt with 3% of Sample F oxidized polyethylene, 20% saturant and no aging.

FIGS. 6 and 7 show homogeneous blends of oxidized Mid-Continent and North Slope asphalt containing 3% of Sample F oxidized polyethylene, 20% saturant and no aging.

Figure 8:
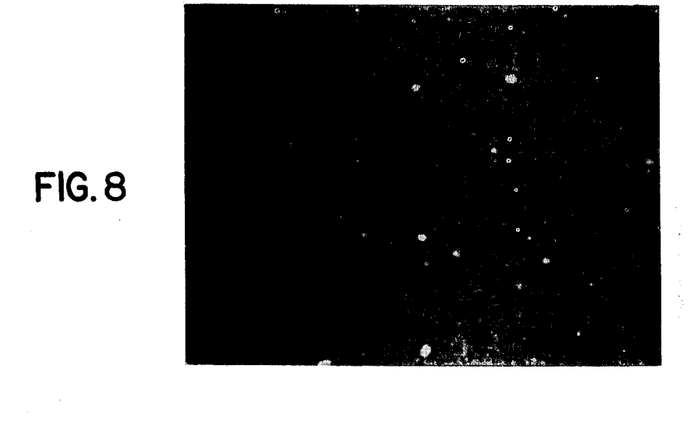
FIG. 8 is a microphotograph of oxidized Mid-Continent asphalt with 6% of Sample F oxidized polyethylene, 20% saturant and no aging.

FIG. 8 shows a blend of oxidized Mid-Continent asphalt, 6% Sample F oxidized polyethylene, 20% saturant and no aging. The dispersion was slightly worse than in FIG. 2 but the blend is stable and homogeneous.

Figure 9:
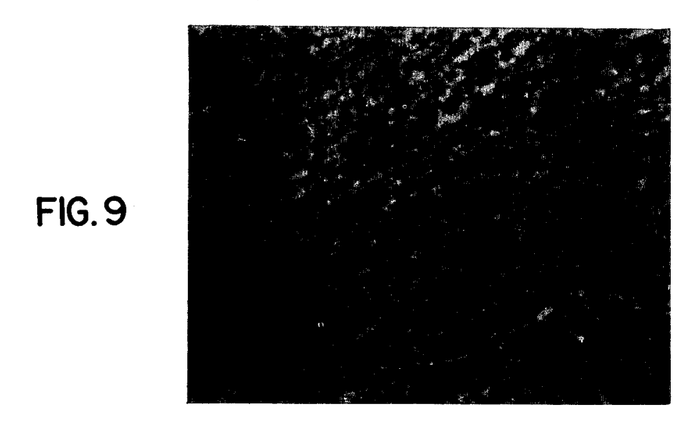
FIG. 9 is a microphotograph of oxidized North Slope asphalt with 6% of Sample F oxidized polyethylene, 20% saturant and no aging.

FIG. 9 shows a blend of oxidized North Slope asphalt, 6% Sample F oxidized polyethylene, 20% saturant and no aging. The dispersion appears to be flocculent and upset. At 6% of Sample F, the Mid-Continent asphalt was more homogeneous and is preferred.

Figure 10:
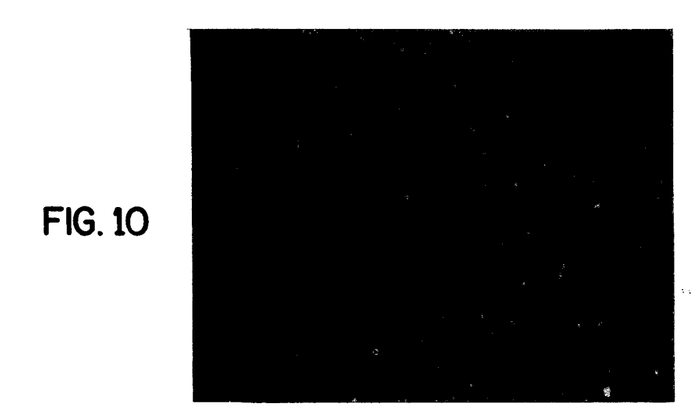
FIG. 10 is a microphotograph of oxidized Mid-Continent asphalt with 3% of Sample F oxidized polyethylene, 20% saturant and three days aging at 350° F.

FIG. 10 shows a homogeneous blend of oxidized MId-Continent asphalt containing 3% of Sample F oxidized polyethylene, 20% saturant and aging for three days at 350° F. There are some coarse particles present which do not appear to be oxidized polyethylene.

Figure 11:
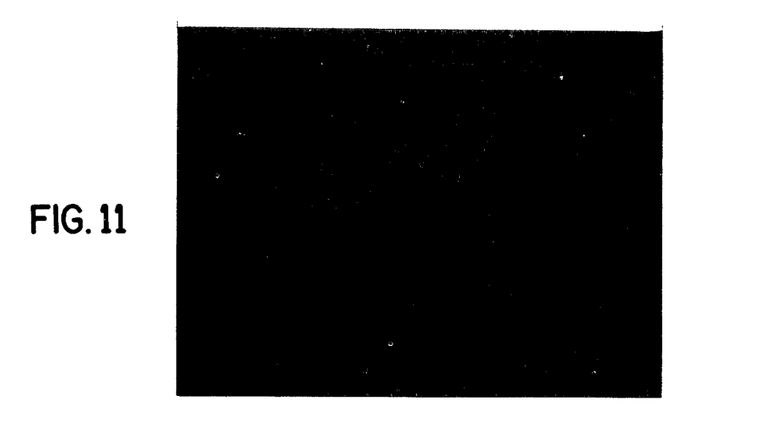
FIG. 11 is a microphotograph of oxidized North Slope asphalt with 3% of Sample F oxidized polyethylene, 20% saturant and three days aging at 350° F.

FIG. 11 shows a homogeneous blend of oxidized North Slope asphalt, containing 3% of Sample F oxidized polyethylene, 20% saturant and aging for three days at 350° F.

Figure 12:
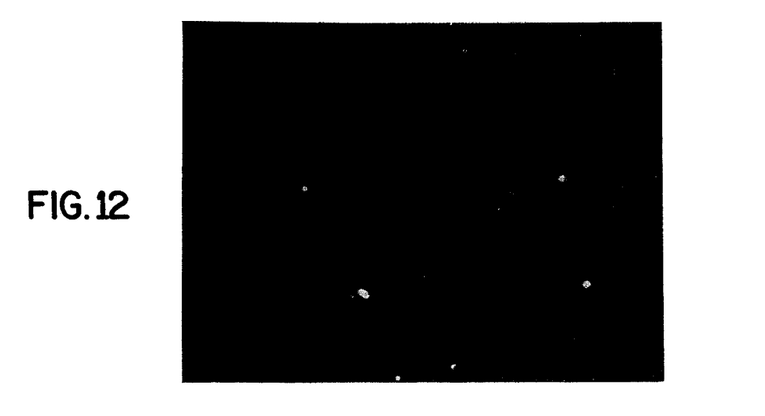
FIG. 12 is a microphotograph of oxidized Mid-Continent asphalt with 3% of Sample F oxidized polyethylene, 20% saturant and aged seven days at 350° F.

FIG. 12 shows a homogeneous blend of oxidized Mid-Continent asphalt containing 3% of Sample F oxidized polyethylene, 20% saturant and aging for seven days at 350° F.

Figure 13:
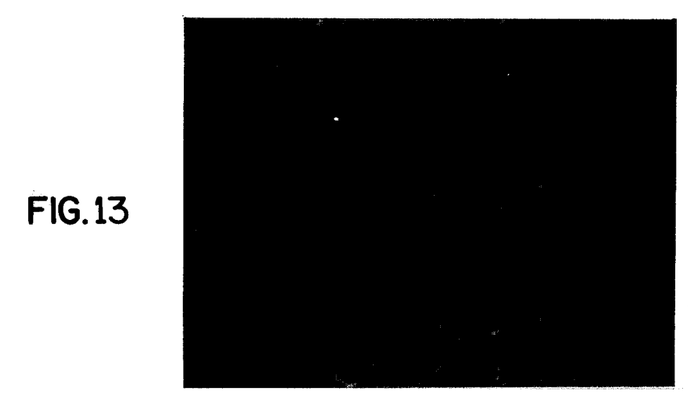
FIG. 13 is a microphotograph of oxidized North Slope asphalt with 3% of Sample F oxidized polyethylene, 20% saturant and aged seven days at 350° F.

FIG. 13 shows a blend of oxidized North Slope asphalt containing 3% of Sample F oxidized polyethylene, 20% saturant and aging for seven days at 350° F. The blend is homogeneous with occasional crystals of what is apparently oxidized polyethylene.

Therefore, the oxidized polyethylene used in the formulation of the present invention achieves compatibility with the oxidized asphalt and results in an asphalt formulation having superior aging properties as well as low temperature flexibility. Additionally, modified asphalt can be used in existing roof shingle production facilities and processes.

The formulation of the roofing asphalt of the present invention can be made by one of two methods. In the first method unoxidized asphalt is mixed with unoxidized polyethylene. The mixture is heated to about 400° F. to 500° F. for about 4 to 6 hours. While it is being heated, air is blown through the mixture. The asphalt becomes crosslinked and oxidized and the polyethylene becomes oxidized. Alternatively, and preferably the asphalt may be oxidized and/or crosslinked to any degree and then the unoxidized polyethylene added. The oxidation process is then continued thereby controlling the oxidation of each component while insuring a uniform and compatible mixture. Under these oxidation conditions, saturant may or may not be needed to control or adjust the viscosity of the blend. The oxidized mixture of asphalt and polyethylene form a compatible colloidal mixture. The viscosity of this mixture can be modified by the addition of saturant when air is no longer being blown through the mixture.

A catalyst can be used during the step of heating and blowing air through the mixture. The mixture can then be heated between 350° F. and 500° F. for 2 to 4 hours and achieve the same result as if a catalyst is not used. A preferred catalyst is ferric chloride ($FeCl_3$), although any catalyst known in the art which is used to oxidize asphalt can be used.

In an alternative and preferred method, oxidized asphalt can be added and mixed directly with oxidized polyethylene. Saturant can be added to the mixture to modify it to the desired viscosity. In this way, a satisfactory formulation is also obtained. The formulations in the above Examples were prepared according to this method.

Modifications, changes, and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the inventions set forth herein, but rather should be limited by the advance of which the invention has promoted the art.

What is claimed is:

1. An improved asphalt coated roofing material of the type having roofing felt coated with asphaltic coating composition wherein the improvement comprises a filled asphaltic coating composition comprising: about 40 percent to about 99 percent by weight of asphaltic composition comprising, about 52 to about 99 percent by weight of oxidized asphalt, about 1 to about 8 percent by weight of oxidized polyethylene and 0 to about 40 percent by weight of a saturant; and about 1 percent to about 60 percent by weight of stone dust.

2. The improved asphalt coated roofing material as recited in claim 1 wherein the asphalt coating composition comprises about 71 to 89 percent oxidized asphalt, about 1 to 4 percent oxidized polyethylene, and about 10 to 25 percent saturant.

3. The improved asphalt coated roofing material as recited in claim 1 wherein the roofing felt is made of fiberglass.

4. The asphaltic coating composition as recited in claim 1 wherein the oxidized polyethylene has a molecular weight between about 1,000 and about 10,000 and a Brookfield Viscosity at 149° C. between about 100 and about 40,000 cps.

5. The asphaltic coating composition as recited in claim 4 wherein the oxidized polyethylene has a molecular weight of between about 3,000 and about 5,000, and a Brookfield Viscosity at 149° C. of between about 8,000 cps and 10,000 cps.

6. The asphaltic coating composition as recited in claim 5 wherein there is:
   77 percent by weight oxidized asphalt;
   3 percent by weight oxidized polyethylene; and
   20 percent by weight saturant.

7. An improved asphalt coated roofing material of the type having roofing felt coated with asphaltic coating composition wherein the improvement comprises an asphaltic coating composition comprising: about 52 to about 99 percent oxidized asphalt; about 1 to about 8 percent by weight of oxidized polyethylene; and 0 to about 40 percent by weight of a saturant.

* * * * *